United States Patent
Kasner

(10) Patent No.: US 7,396,083 B2
(45) Date of Patent: Jul. 8, 2008

(54) SINGLE-LEGGED BODY SUPPORT SYSTEM

(76) Inventor: Curtis E. Kasner, 4509 Pinon Ridge Dr., San Angelo, TX (US) 76904

( * ) Notice: Subject to any disclaimer, the term of this patent is extended or adjusted under 35 U.S.C. 154(b) by 0 days.

(21) Appl. No.: 11/707,435

(22) Filed: Feb. 19, 2007

(65) Prior Publication Data

US 2007/0224875 A1    Sep. 27, 2007

Related U.S. Application Data

(60) Provisional application No. 60/786,302, filed on Mar. 23, 2006.

(51) Int. Cl.
*A47C 1/12* (2006.01)

(52) U.S. Cl. ............ 297/451.4; 297/451.5; 297/451.13; 297/4; 297/195.11; 297/188.09

(58) Field of Classification Search ............. 297/451.4, 297/451.5, 451.13, 4, 452.46, 452.47, 195.11, 297/195.1, 217.2, 217.6, 188.09
See application file for complete search history.

(56) References Cited

U.S. PATENT DOCUMENTS

| | | | | |
|---|---|---|---|---|
| 671,638 | A * | 4/1901 | Slagle | 297/4 |
| 690,122 | A * | 12/1901 | Slagle | 248/155 |
| 1,267,953 | A * | 5/1918 | Zolp | 297/4 |
| 1,564,339 | A * | 12/1925 | Fraser et al. | 33/515 |
| 2,099,345 | A | 11/1937 | Olszanowski | |
| 4,085,686 | A | 4/1978 | Turner et al. | |
| 4,232,896 | A * | 11/1980 | Caldwell | 297/4 |
| 4,451,080 | A * | 5/1984 | Nix | 297/4 |
| 4,674,598 | A | 6/1987 | Sides et al. | |
| 4,929,021 | A * | 5/1990 | Kaye | 297/188.09 |
| 4,930,839 | A | 6/1990 | Saito et al. | |
| 5,441,433 | A * | 8/1995 | Stanley | 441/130 |
| 5,673,966 | A * | 10/1997 | Morton, Jr. | 297/4 |
| 5,720,522 | A | 2/1998 | Habeck | |
| 5,746,481 | A * | 5/1998 | Obermaier | 297/452.41 |
| 5,927,797 | A | 7/1999 | Ferguson | |
| 6,062,638 | A | 5/2000 | Ferguson | |
| 6,176,545 | B1 * | 1/2001 | Hambleton | 297/4 |
| 6,893,097 | B1 * | 5/2005 | Ebensperger et al. | 297/451.4 |

* cited by examiner

*Primary Examiner*—Laurie K Cranmer
(74) *Attorney, Agent, or Firm*—Charles Kulkarni, Esq.; Jackson Walker L.L.P.

(57) ABSTRACT

A body support system for providing support to a user is provided. In certain embodiments, a body support system comprises a single leg having a first end and a second end; a seat attached to the first end of the single leg; a base attached to the second end of the single leg, the base having a curved surface capable of securely engaging a ground surface at a range of angles; and a strap having a first end and a second end wherein the first end of the strap is attached to the single-legged body support system and wherein the second end of the strap is capable of attaching to a user.

14 Claims, 5 Drawing Sheets

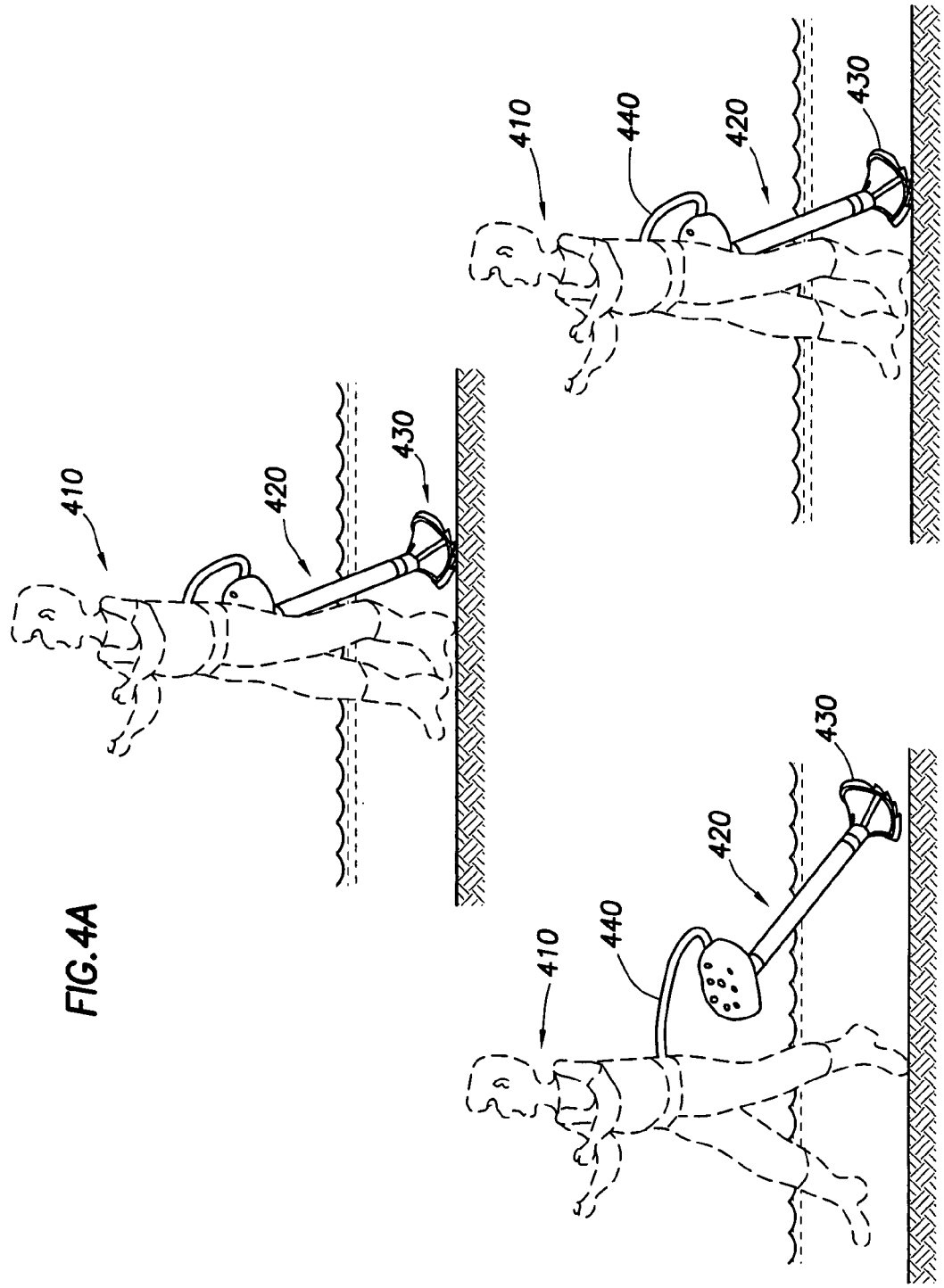

SINGLE-LEGGED BODY SUPPORT SYSTEM

CROSS-REFERENCE TO RELATED APPLICATION

The present application claims priority to U.S. Provisional Patent Application Ser. No. 60/786,302, entitled A Buoyant Single-Legged Support System for Fisherman, filed on Mar. 23, 2006, the entirety of which is hereby incorporated by reference.

BACKGROUND

The present invention generally relates to body support devices and more particularly, to single legged body support systems for use by fisherman and other outdoor enthusiasts.

Portable and collapsible seating devices have been heretofore proposed for the problem of providing a seating devices for the many occasions where outdoor seating is not available, such as during fishing, outdoor gatherings, and sporting events among others. For example, some activities, such as wade fishing may entail a fisherman standing outside for hours without being able to sit down and without a structure to lean on for support. This lack of seating or support structures can often result in undesirable fatigue and/or back pain among other problems.

Several solutions for such outdoor seating have heretofore been provided such as the portable and collapsible seat as described in U.S. Pat. No. 4,232,896, the single-legged chair as described as described in U.S. Pat. No. 4,930,839, the portable stool as described in U.S. Pat. No. 6,062,638, and the portable seat as described in U.S. Pat. No. 5,720,522. Unfortunately, all of the portable seat and/or support devices heretofore proposed suffer from one or more disadvantages including not being suitable for use during certain fishing activities such as wade fishing. In particular, many of the conventional seat/support devices are not capable of resisting the highly corrosive salt water environments inherent in many fishing locations. Further, many of the conventional devices are not buoyant and consequently, would sink in the water if released. Often, the conventional devices lack a strap to prevent the device from being separated from the user. Additionally, conventional devices suffer from a number of other disadvantages such as being incapable of simultaneously used as a storage device.

In some cases, it may be desirable for a person to drag a support device along with the person as the person moves about. Examples of activities with such a need are golf spectators who stay in a spot for a period of time before moving to the next golf hole or during fishing where a fisherman may fish in one spot for a period of time before moving on to another spot.

Other disadvantages of the prior art include a lack of comfort due in part to too small a seat size and lack of portability of the support device, including the inability to easily carry the device due to weight and/or physical configuration of the device.

Accordingly, it would be desirable to have a support device upon which users may lean that addresses one or more of the disadvantages of the prior art.

SUMMARY

The present invention generally relates to body support devices and more particularly, to single legged body support systems for use by fisherman and other outdoor enthusiasts.

An example of a body support system for providing support to a user comprises a single leg having a first end and a second end; a seat attached to the first end of the single leg; a base attached to the second end of the single leg, the base having a curved surface wherein the curved surface is capable of securely engaging a ground surface at a range of angles; and a strap having a first end and a second end wherein the first end of the strap is attached to the single-legged body support system and wherein the second end of the strap is capable of attaching to a user.

One example of a method for providing support to a user with a body support system comprising the steps of providing a body support system comprising a single leg having a first end and a second end, a seat attached to the first end of the single leg, a base attached to the second end of the single leg wherein a curved surface of the base is capable of securely engaging a ground surface at a range of angles, and a strap having a first end and a second end wherein the first end of the strap is attached to the body support system and wherein the second end of the strap is capable of attaching to a user; attaching the body support system to the user; and leaning against the seat of the body support system such that the base engages the ground surface.

Advantages of various embodiments of the present invention include, in part, suitability for use in fishing environments. For example, the buoyancy of certain embodiments may prevent the device from sinking. The buoyancy of the device combined with a secure strap reduces the likelihood of the user being undesirably separated from the device itself. Further, certain embodiments may have the benefit of being constructed of a material resistant to the highly corrosive fishing environments such as salt water.

Other embodiments have the advantage of being capable of use as a storage device in addition to being used as a support structure. Additionally, certain embodiments have the benefit of low cost construction attributable to an efficient device design. Still other embodiments have the advantageous feature of a portion of the device being transparent to allow easy inspection of the device by security personnel to allow visualization of the interior of portions of the device.

The features and advantages of the present invention will be apparent to those skilled in the art. While numerous changes may be made by those skilled in the art, such changes are within the spirit of the invention.

BRIEF DESCRIPTION OF THE DRAWINGS

A more complete understanding of the present disclosure and advantages thereof may be acquired by referring to the following description taken in conjunction with the accompanying figures, wherein:

FIGS. 4A, 4B, and 4C illustrate a method of use of one embodiment of a body support device.

Figure 1A:
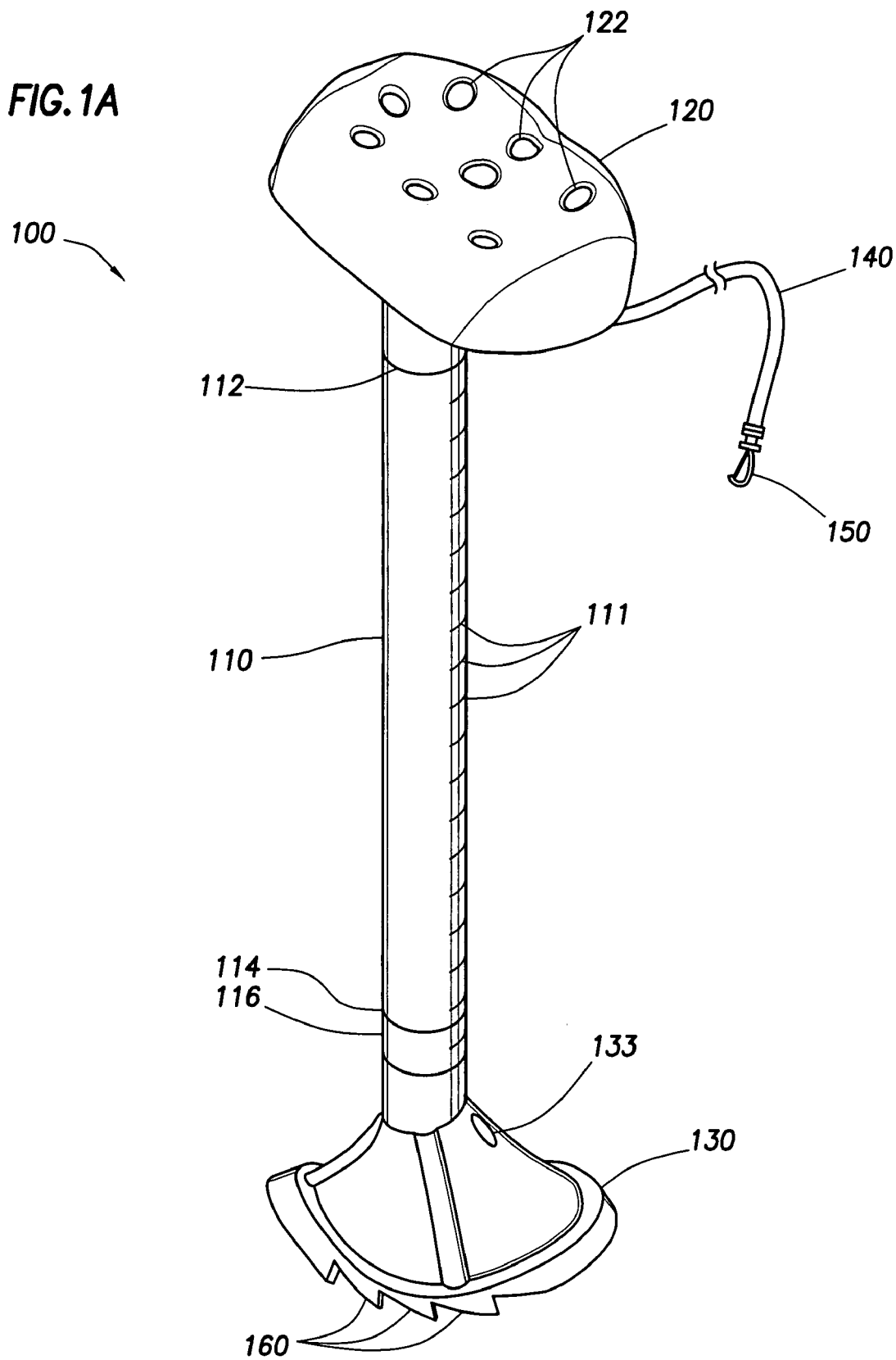
FIG. 1A illustrates a perspective view of one embodiment of a body support device.

While the present invention is susceptible to various modifications and alternative forms, specific exemplary embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DESCRIPTION OF PREFERRED EMBODIMENTS

The present invention generally relates to body support devices and more particularly, to single legged body support systems for use by fisherman, water fowler, and other outdoor enthusiasts.

In certain embodiments, body support systems of the present invention comprise, among other features, a seat, a single support leg, and a base, each having one or more of the features as discussed in more detail below.

To facilitate a better understanding of the present invention, the following examples of certain embodiments are given. In no way should the following examples be read to limit, or define, the scope of the invention.

FIG. 1A illustrates a perspective view of one embodiment of a body support device. In this embodiment, body support device 100 is comprised of a single support leg 110, seat 120, and base 130. Single support leg 110 has first end 112 and second end 114. First end 112 of single support leg 110 is attached to seat 120 and second end 114 is attached to base 130 via union 116.

Body support device 100 allows a user (not shown) to lean or sit upon seat 120 when base 130 engages the ground. Body support device 100 may be used outdoors on dry land or alternatively, in bodies of water. For example, a fisherman may use body support device 100 to provide a portable support seat while fishing. In the example of a fisherman, having a lightweight, portable seat may be particularly advantageous for those fisherman who spend long periods of time in a single spot while wade fishing before moving on to another fishing spot.

Any suitable attachment means known in the art may be used to attach seat 120 and base 130 to single support leg 110 including, but not limited to, screw connections, glue, compression bonding, thermal bonding, screws, nails, clip connections, interference fits, or any combination thereof. Indeed, any of the components of body support device 100 may be attached or connected in this way.

As illustrated in FIG. 1A, base 130 preferably has a curved surface on the bottom of base 130 for engagement with a ground surface. The curved surface of base 130 may be convex or have an outer perimeter that is convex in some embodiments. The curved surface of base 130 permits body support device 100 to engage a ground surface at a range of angles. This range of angles allows a user to use body support device 100 at a variety of desired inclinations. In this way, a user may lean upon body support device 100 at different desired angles, which also has the added benefit of allowing body support device 100 to be used with users of varying heights. In other words, body support device 100 is adjustable in that curved surface of base 130 permits body support device to be used at a variety of inclinations, and thus, is adapted to being used by persons of varying heights.

In certain embodiments, base 130 includes oriented teeth 160 as shown in FIG. 1A. Oriented teeth 160 aid the engagement of base 130 with a ground surface. The direction of oriented teeth 160 provide a relatively high friction when dragged along a ground surface in a first direction but provide relatively little or low friction when dragged in the opposite direction. Thus, oriented teeth 160 provide a mechanism by which body support device 100 may be easily dragged in one direction behind a user and securely engages the ground when the user attempts to lean on body support device 100 in the opposite direction. In this way, oriented teeth 160 help prevent body support device 100 from "slipping out" from under a user when the user is leaning against seat 120. Depending on the angle that body support device 100 is used at a given moment, only a portion of oriented teeth 160 may engage a ground surface at a particular moment.

Seat 120 is shown with plurality of apertures 122. Apertures 122 provide a number of functions including, in certain embodiments, adding reinforcement or durability to seat 120 where apertures 122 are constructed with a reinforcing lip. Additionally, apertures 122 provide passages for air flow so as to provide ventilation for a user. In a water environment, such as those that might be used by a fisherman, apertures 122 also reduce the drag of body support device 100 as body support device 100 is pulled or dragged through the water. Furthermore, apertures 122 reduce the weight of body support device 100, which has the added benefit of making body support device 100 easier to carry and more buoyant when used in water. Although apertures 122 are shown here as circular holes, apertures 122 may be of any suitable shape including, but not limited to, circular apertures, cylindrical apertures, rectangular slits, square-shaped apertures, parabolic apertures, elliptical apertures, complex or random shaped apertures, or any combination thereof.

As shown in FIG. 1A, seat 120 may be contoured to provide a more comfortable seating surface for a user. Additionally, strap 140 may attach to seat 120 to allow body support device 100 to be secured to a user via connection mechanism 150. Strap 140 may attach to seat 120 by any suitable attachment mechanism known in the art including, but not limited to, snap-type closures, Velcro-type closures, or even a tie-wrap as desired. Strap 140 may be attached to a user via connection mechanism 150 to a user's belt or any suitable attachment anchor point of a user. In the case of a fisherman, anchor points are generally available at numerous points on the typical clothing of a fisherman in addition to the belt of the fisherman. In this way, strap 140 prevents body support device 100 from being inadvertently separated from the user by, for example, from the action of wave forces in a body of water or by theft of another individual. Strap 140 may be made of any suitable durable material including, but not limited to, nylon, plastic cords, cotton, synthetic materials, or any combination thereof. Strap 140 may also be attached to single support leg 110.

Figure 1B:
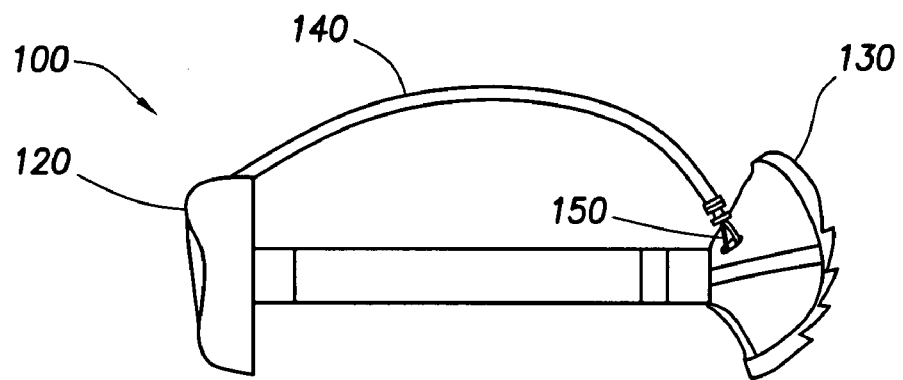
FIG. 1B illustrates a portable body support device adapted to being carried by a strap.

FIG. 1B illustrates a portable body support device adapted to being carried by a strap. Connection mechanism 130 of strap 140 attaches to a slit or hole in base 130. In this way, strap 140 may be used to carry device by using strap 140 as a handle or, in some cases, by slinging strap 140 over one's shoulder.

Returning to FIG. 1A, other optional features of body support device 100 include demarcated ruler 111 and fish spot 133. Demarcated ruler 111 allows a user to measure the length of any item, including the length of fish. In some cases, ruler 111 may be demarcated in inches and/or in centimeters or any units suitable for length measurement. Measuring the length of fish may be important for fisherman to determine whether a fish is meets the relevant size limit. In this way, a fisherman may conveniently use demarcated ruler 111 to determine whether a fish is below the relevant size limit and thus whether it must be thrown back. Fish spot 133 is a spot characteristic of a fish called Red Drum fish, often commonly referred to as Red fish. Fish spot 133 communicates to consumers that the device may be used by Red Drum fisherman.

Additionally, demarcated ruler 111 may be demarcated to measure water depth. For example, suitable demarcations of single support leg 110 for various water depths may include water depths of 1 foot, 2 foot, and 3 foot. Measuring the water depth can be important in fishing, because as many fisherman will recognize, a fisherman may be able to catch certain fish in certain water depths but not other water depths under prevailing conditions. Thus, knowing the water depth one is fishing in can make the difference between catching fish or not catching fish.

Body support device 100 and its various components may be constructed out of any durable material, including, but not limited to, various plastics known in the art, PVC, polyetheretherketones (i.e. PEEK), Acrylonitrile Butadiene Styrene (ABS), rubber, silicone, various lightweight metals such as aluminum, or any combination thereof.

Figure 2A:
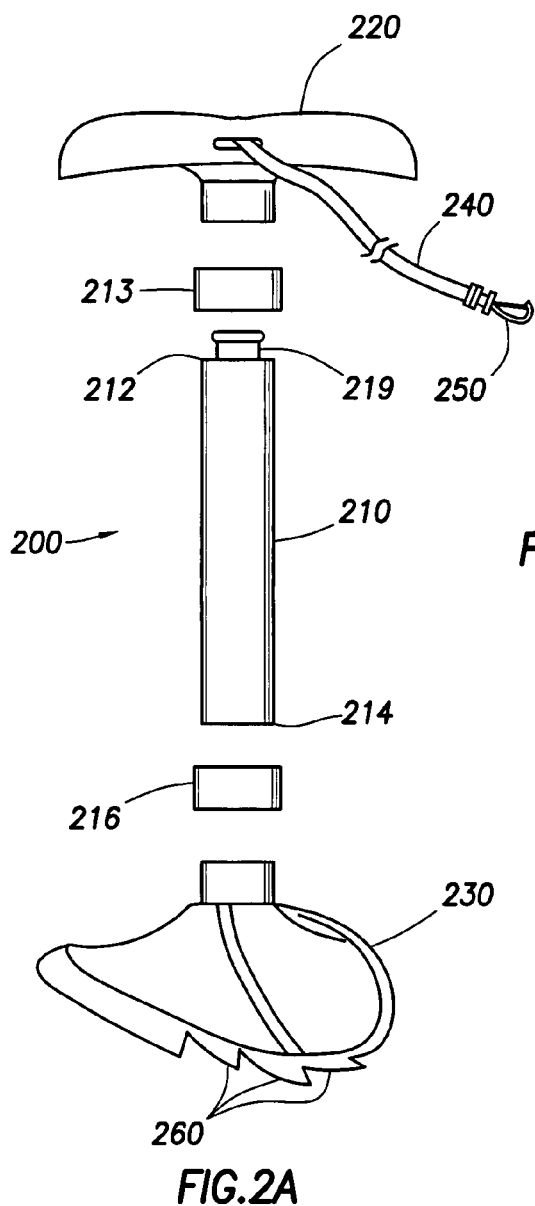
FIG. 2A illustrates an exploded side view of one embodiment of a body support device.

FIG. 2A illustrates an exploded side view of one embodiment of a body support system. Here, screwed unions 213 and 214 attach single support leg 210 respectively to seat 220 and base 230. Like the embodiment depicted in FIG. 1, base 230 may be a curved base with oriented teeth 260. Furthermore, strap 240 may attach to seat 220 via any attachment mechanisms known in the art, such as glue, threading and looping around any one of the apertures in seat 220, including, but not limited to, snap-on attachment mechanisms that allow strap 240 to be removable from seat 220.

Figure 2B:
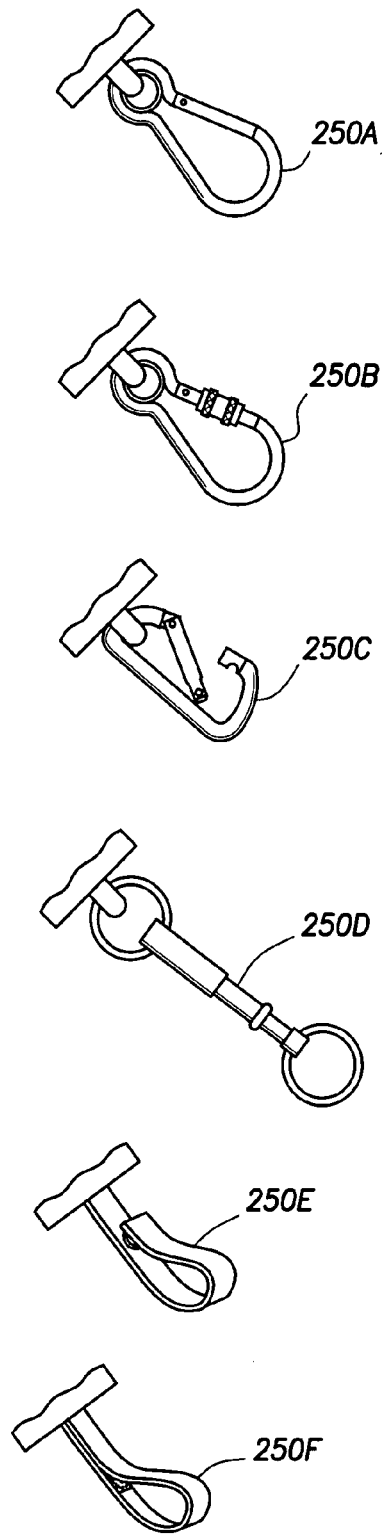
FIG. 2B illustrates several types of latching mechanisms for use with a body support device.

Connection mechanism 250 is also provided at the free end of strap 240 for attaching to a user. Connection mechanism 250 may use any of the types of connections mechanisms shown in FIG. 2B. Connection mechanisms 250A-F show a variety of latching mechanisms suitable for use with either end of strap 240, such as a spring-loaded gate carabineer, a screw-gate carabineer, a free-gate carabineer, a quick-release key chain type mechanism, a snap-type strap, or a hook-and-loop type fastener (e.g. a Velcro™ fastener).

Single support leg 210 may be hollow in certain embodiments. Using a hollow member for single support leg 210 may be advantageous in reducing the weight of body support device 200 so as to produce a more lightweight device, and in some cases, a more buoyant body support device. In this way, body support system 200 may be buoyant in fresh water and/or salt water. Additionally, a hollow single support leg allows items to be stored in single support leg 210, such as, for example, umbrella 219. Thus, when a hollow single support leg is combined with a removable seat, body support device may function as an umbrella holder and carrier in addition to functioning as a body support device. In certain embodiments, seat 220 is removable by unscrewing seat 220 from either union 213 or by unscrewing union 213 from single support leg 212. Seat 220 may also be hinged. Alternatively, embodiments are also contemplated wherein base 230 is also removable to allow storage of items in single support leg 210. An added advantage of a removable seat and a removable base is that body support device 200 may be conveniently disassembled for storage or transport. In other embodiments, seat 220 may be moved from a first position to a second position so as to allow access to the substantially hollow single leg.

In those embodiments that are used in fishing contexts, waterproof connections are preferred to prevent water from leaking into single support leg 210. Preventing water leakage into single support leg 210 may be desirable to retain the buoyancy of body support device 200 and prevent water damage to any items stored within single support leg 210. Any waterproofing method known in the art may be used to waterproof body support device 200 including, but not limited to, sealants, o-rings, interference fits, or any combination thereof.

In certain embodiments, single support leg 210 is formed of a clear or transparent material that permits the contents of single support leg 210 to be visualized without having to physically remove seat 220 to allow inspection of the interior of single support leg 210. This feature may be particularly convenient and useful for the use of body support device in areas with heightened security such as certain spectator sporting events and concerts.

In still other embodiments, single support leg 210 is filled with a foam (not shown), which may be a spray-foam, a buoyant foam, a floatation foam, or any combination thereof. Suitable foams include, but are not limited, urethanes, polystyrenes, and combinations thereof.

Figure 3:
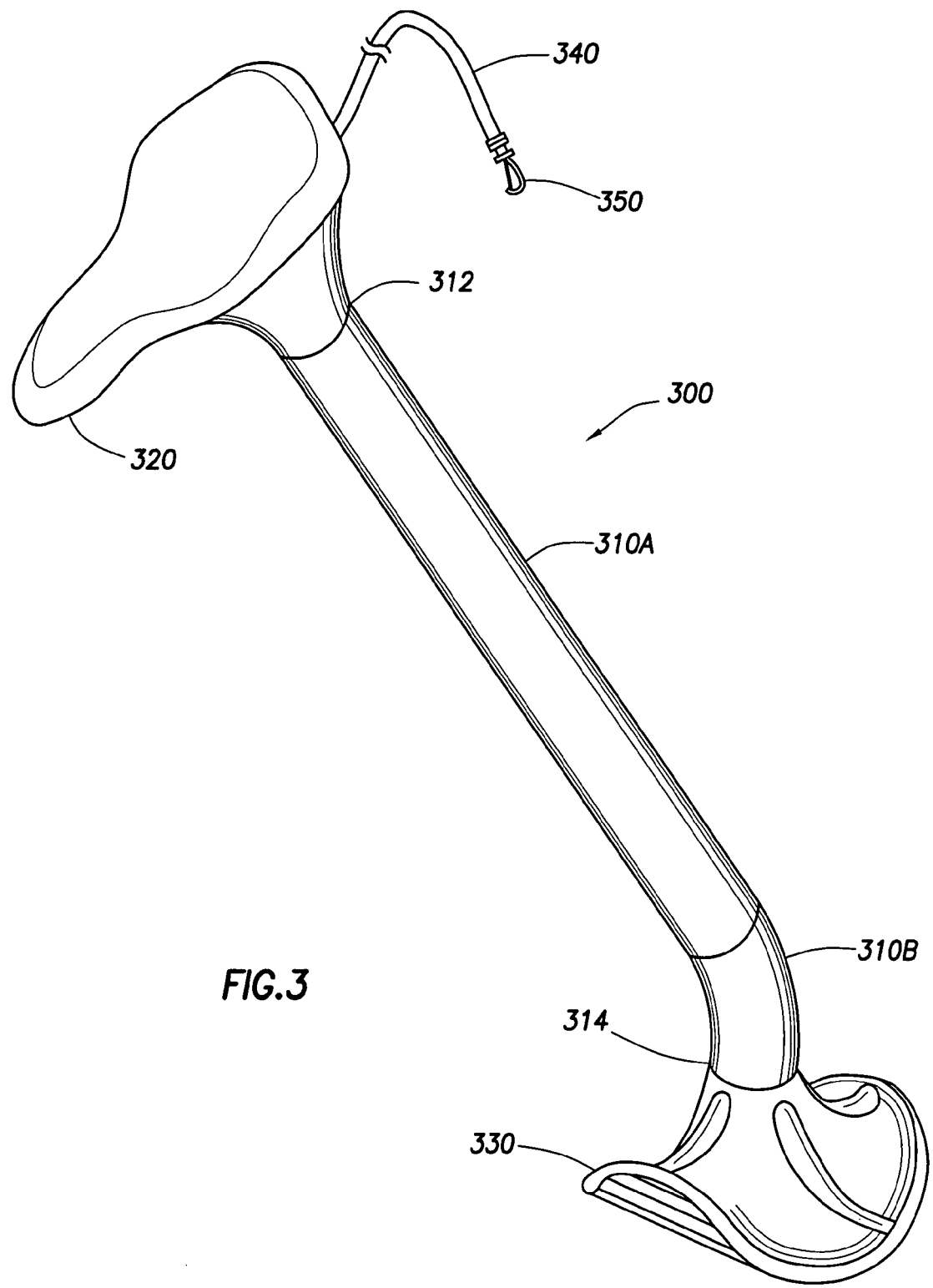
FIG. 3 illustrates a side view of another embodiment of a body support device.

FIG. 3 illustrates a side view of another embodiment of a body support device. Here, seat 320 is shown in the form of a bicycle seat, although seat 320 may be comprised of any surface suitable for engaging a surface area of a user so as to allow the user to lean upon body support device 300.

Single support leg may be any suitable shape, including cylindrical as depicted in FIG. 2A. Suitable shapes include, but are not limited to, a rectilinear shape, a double-barrel leg, etc. Additionally, single support leg 310 may be composed of several longitudinal sections 310A and 310B to form one single leg 310. Also, single support leg may be bent or angled at any point or points along its length. As shown in this figure, single support leg 310 begins a sloping angle where 310A attaches to section 310B. By angling single support leg 310, body support system may provide a more superior support function to a user.

Weighted plugs or inserts may be placed in a portion of single support leg 310, such as in section 310B and/or in or on base 130. Weighted plugs function to aid orientation of the device. In water environments, for example, where body support device 300 or portions thereof are buoyant, weighted plugs in section 310B can help to keep base 330 engaged with the ground instead of floating to the surface.

As can be seen in FIG. 3, the underside of curved base 330 is hollow such that curved base 330 comprises a substantially saddle-shaped surface transitioning to a conical surface attached to attachment point 314. Curved base 330 may be described as a disc-shaped surface with one or more upturned sides or a circular base wherein a portion of the opposing sides are turned upwards.

Other optional features include an adjustable single support leg that is adjustable by way of telescoping members, FIGS. 4A, 4B, and 4C illustrate a method of use of one embodiment of a body support device. Here, body support device 420 is shown in use in conjunction with a user 410 in a water environment. User 410 who may be a fisherman leans against body support device 420 while resting in one spot as shown in FIG. 4A. Strap 440 may be used to attach body support device 420 to user 410 as depicted in FIG. 4B. Strap 440 also allows user 410 to advance forward while dragging body support device 420 behind user 410. As shown in FIG. 4B, base 430 may lift off of the ground surface as user 410 pulls or drags body support device 420 along. Once user 410 arrives at a new location and ceases forward movement once again, base 430 settles on and engages the ground surface. Now, body support device 420 is ready for use so as to provide a support for user 410.

Figure 5:
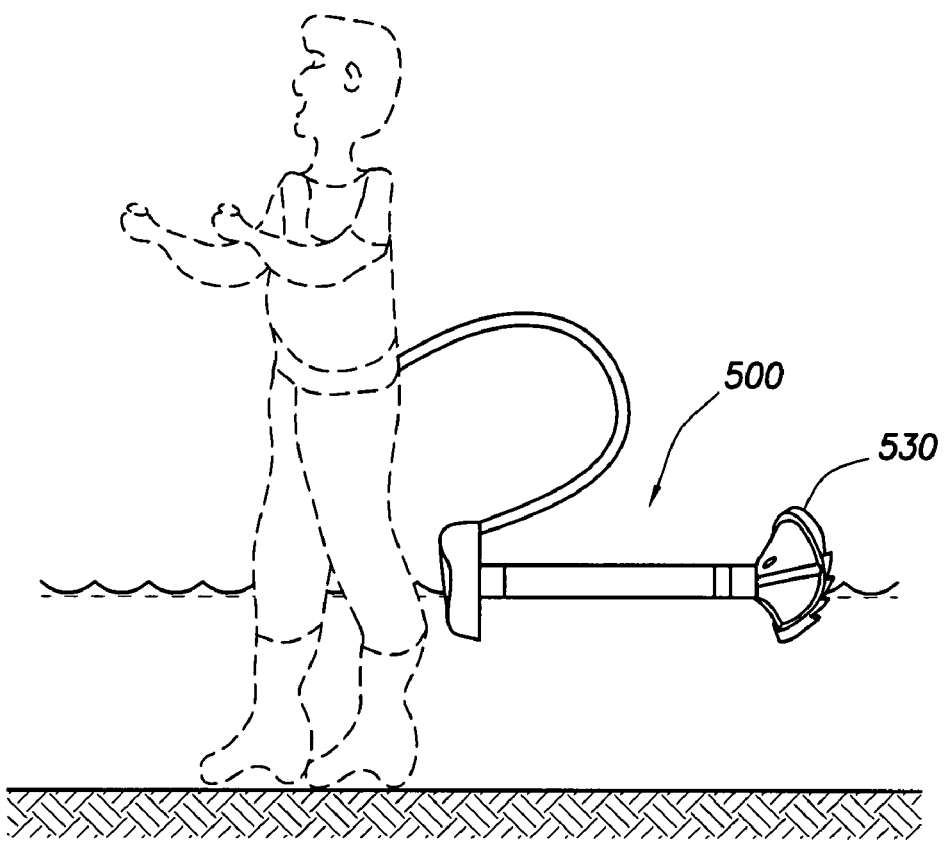
FIG. 5 illustrates one embodiment of a body support device capable of floating on the surface of water.

FIG. 5 illustrates one embodiment of a body support device capable of floating on the surface of water. As opposed to the embodiments depicted in FIGS. 4A, 4B, and 4C, base 530 may not be weighted so as to orient to the bottom of the water.

Instead, the entire body support device 500 may be capable of floating. This floating embodiment of body support device 500 may be advantageous in that its lower weight makes it is easier to carry and easier to drag behind oneself when moving from one location to another.

Other optional features or devices that may be used in conjunction with the body support device are GPS devices, emergency locator beacons, or radar or sonar fish locating devices. The GPS device may be used by a user to locate the user's current or prior locations. An emergency locator beacon, on the other hand, may be used by others to locate the user in the case of distress or other emergency. Additionally, shark repelling devices such as the one disclosed in U.S. Pat. No. 6,606,963 may be incorporated into or attached to the body support device. Any number of other items may be attached to the body support device such as tackle aprons or other items useful to fisherman or outdoor enthusiasts.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee.

What is claimed is:

1. A body support system for providing support to a user comprising:
    a single leg having a first end and a second end wherein the single leg is substantially hollow and substantially buoyant;
    a seat attached to the first end of the single leg;
    a base attached to the second end of the single leg, the base having a convex disc-shaped surface with one or more upturned sides wherein the convex disc-shaped surface is capable of securely engaging a ground surface at a range of angles; and
    a strap having a first end and a second end wherein the first end of the strap is attached to the single-legged body support system and wherein the second end of the strap is capable of attaching to a user
    wherein the convex-disc shaped surface of the base further comprises a plurality of teeth wherein the teeth are oriented wherein the oriented teeth provide relatively high friction when dragged along a ground surface in a first direction but provide relatively little friction when dragged in an opposite direction to the first direction.

2. The body support system of claim 1 wherein the first end of the strap is attached to the seat.

3. A body support system for providing support to a user comprising:
    a single leg having a first end and a second end wherein the single leg is substantially hollow and substantially buoyant;
    a seat attached to the first end of the single leg;
    a base attached to the second end of the single leg, the base having a convex disc-shaped surface with one or more upturned sides wherein the convex disc-shaped surface is capable of securely engaging a ground surface at a range of angles; and
    a strap having a first end and a second end wherein the first end of the strap is attached to the single-legged body support system and wherein the second end of the strap is capable of attaching to a user wherein the seat can be moved from a first position to a second position so as to allow access to the substantially hollow single leg.

4. The body support system of claim 3 wherein the convex-disc shaped surface of the base further comprises a plurality of teeth wherein the teeth are oriented.

5. The body support system of claim 3 comprising:
    wherein the seat is removable and reattachable to the single leg; and
    wherein the seat is a surface having a plurality of apertures through the surface of the seat.

6. The body support system of claim 5 wherein the base has a plurality of oriented teeth such that the oriented teeth provide relatively high friction when dragged along a ground surface in a first direction but provide relatively little friction when dragged in an opposite direction to the first direction.

7. The method of claim 3 wherein the single leg further comprises a layer of camouflage so as to aid in the concealment of the device in its environment.

8. A body support system for providing support to a user comprising:
    a single leg having a first end and a second end wherein the single leg is substantially hollow and substantially buoyant;
    a seat attached to the first end of the single leg;
    a base attached to the second end of the single leg, the base having a convex disc-shaped surface with one or more upturned sides wherein the convex disc-shaped surface is capable of securely engaging a ground surface at a range of angles; and
    a strap having a first end and a second end wherein the first end of the strap is attached to the single-legged body support system and wherein the second end of the strap is capable of attaching to a user wherein the seat is removable and reattachable to the single leg so as to allow access to the substantially hollow single leg.

9. The body support system of claim 8 wherein the single leg is comprised of plastic having sufficient transparency to allow a visual determination of the contents of the single leg.

10. The body support system of claim 8 wherein foam is disposed in the single leg.

11. The body support system of claim 8 wherein the seat is a surface having a plurality of apertures through the surface of the seat so as to allow water or air to pass through the seat.

12. The body support system of claim 8 wherein the single leg has a demarcated ruler along a length of the single leg so as to allow measuring the length of items.

13. The body support system of claim 8 wherein the single leg is comprised of a plastic wherein the plastic is polyvinyl chloride or acrylonitrile butadiene styrene.

14. The body support system of claim 8 wherein the single leg further comprises a layer of camouflage coloring so as to aid in the concealment of the device in its environment.

* * * * *